United States Patent [19]
Wehrmeister

[11] 3,879,524
[45] Apr. 22, 1975

[54] METHOD OF TRANQUILIZING ANIMALS

[75] Inventor: Herbert L. Wehrmeister, Terre Haute, Ind.

[73] Assignee: Commercial Solvents Corporation, Terre Haute, Ind.

[22] Filed: Dec. 4, 1972

[21] Appl. No.: 312,078

[52] U.S. Cl.............. 424/270; 260/307 F; 424/272
[51] Int. Cl............................................ A61k 27/00
[58] Field of Search................................... 424/270

[56] References Cited
OTHER PUBLICATIONS
Chem. Abst. (1), 71 - 81347J (1969).
Chem. Abst. (2), 71 - 38861K (1969).
Handrick et al., J. Med. Chem., 8 - 762-766, (1965).

*Primary Examiner*—Stanley J. Friedman
*Attorney, Agent, or Firm*—Robert H. Dewey; Howard E. Post

[57] ABSTRACT

A method of tranquilizing warm-blooded animals comprising administering thereto orally or intravenously a tranquilizing amount of a compound, or a phramaceutically acceptable salt thereof, corresponding to the formula

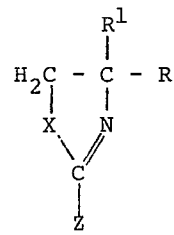

where X is —O— or —S—, R and $R^1$ are hydrogen, methyl or hydroxymethyl and are the same or different, and Z is methyl, ethyl, methoxymethyl, p-methoxyphenyl; or 4,4-dimethyl-2-oxazolylethyl; 4,4-dimethyl-2-oxazolylbutyl; or the group

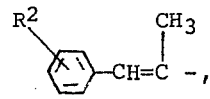

where $R^2$ is hydrogen, chloro- or dimethylamino-.

3 Claims, No Drawings

METHOD OF TRANQUILIZING ANIMALS

BACKGROUND OF THE INVENTION

This invention relates to a method of tranquilizing warm-blooded animals. In a particular aspect, this invention relates to a method of tranquilizing animals by administering thereto an oxazoline or thiazoline.

Tranquilizing agents are very useful in calming animals. For example, in veterinary medicine and in zoology they are very helpful treating sick animals and in the capture and transportation of wild animals. Many tranquilizing agents are known, among which are oxazolines of the formula

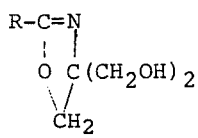

where R is halogenyl phenyl, o-hydroxyphenyl or m-trifluoro methyl, as disclosed by L. F. Wiggins et al., U.S. Pat. No. 3,235,557.

SUMMARY OF THE INVENTION

It is an object of this invention to provide a method of tranquilizing warm-blooded animals.

It is another object of this invention to provide a method of tranquilizing animals by administering thereto a compound of the class of oxazolines and thiazolines.

Other objects of this invention will be apparent to those skilled in the art from the disclosure herein.

It is the discovery of this invention that compounds, or pharmaceutically acceptable salts thereof, represented by the formula

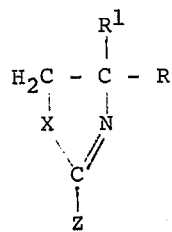

are tranquilizing agents when administered to warm-blooded animals. In the formula, X is —O— or —S—; R and $R^1$ are hydrogen, methyl or hydroxymethyl and are the same or different; Z is methyl, ethyl, methoxymethyl or p-methoxyphenyl; or Z is 4,4-dimethyl-2-oxazolylethyl or 4,4-dimethyl-2-oxazolylbutyl; or Z is the group

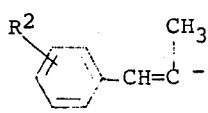

where $R^2$ is hydrogen, chloro-, or dimethylamino-.

DETAILED DISCUSSION

The oxazolines of the present invention wherein Z is

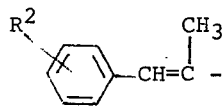

are known in the art. They can be readily prepared by the method of H. L. Wehrmeister, *J. Org. Chem.* 27, 4418 (1962) by condensing benzaldehyde or the appropriate substituted benzaldehyde with a 2-ethyl-2-oxazoline. When Z is 4,4-dimethyl-2-oxazolylethyl or oxazolylbutyl, the compounds can be prepared by condensing two moles of an appropriate alkanolamine with a dibasic acid, e.g. adipic or succinic acid, by known methods, e.g. the method of Purcell, cited hereinbelow. 4,4-Dimethyl-2-ethyl-2-thiazoline of Example 8 is a known compound, commercially available, or it can be prepared by the method of G. R. Handrick et al., *J. Med. Chem.* 8, 762 (1965).

The oxazolines wherein Z is p-methoxyphenyl or methoxymethyl can be readily prepared by known methods, e.g. the method of Purcell, U.S. Pat. No. 3,336,145, by condensing an alkanolamine corresponding to the formula

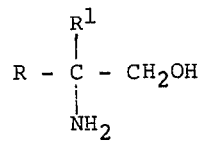

where R and $R^1$ have the same meaning set forth before, with an appropriate acid, e.g. p-methoxybenzoic acid or methoxyacetic acid.

The compounds of the present invention have been found to exert a depressant action on the central nervous system when tested under standard and accepted pharmacological procedures, in aninmals, such as mice. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents. Specifically, the compounds may be employed to induce a calming effect in animals.

In the pharmacological evaluation of the biological activity of the compounds of this invention, the in vivo effects were tested by two different tests. In one, the oral toxicity was determined by administration to a group of laboratory mice. A trained observer watched the mice closely for several hours and noted decreased motor activity. The second test was that described by Horn, *Biometrics*, 12:311 (1956). In this test, laboratory mice received the test compound (two mice per dose level) at one-half log-dosage intervals by intravenous injection. The animals were observed by trained observers and pharmacological signs of tranquilization were noted. The median lethal dose ($LD_{50}$) and the median effective dose ($MED_{50}$) for tranquilization were estimated. The safety factor was taken as the ratio of $LD_{50}/MED_{50}$.

The compounds of this invention are active as central nervous depressants at an oral dose of generally in the range of about 1 to about 1,000 mg/kg. However most compounds will be effective within the range of 10–100 mg/kg. When administered intravenously, a dosage within the range of about 1.8 – 560.0 mg/kg is effective, but a dosage within the range of 3.2 – 180.0 mg/kg is generally sufficient. In many cases a dosage within the range of 5.6 – 100.0 mg/kg will be satisfactory.

These compounds are weakly alkaline and readily form salts with most acids. Many of these salts are water-soluble and advantageously can be used for administering these compounds. The invention therefore contemplates the administration of pharmaceutically acceptable salts of these oxazolines and thiazolines as well as the unneutralized compounds themselves.

This invention will be better understood by reference to the following examples. It is understood, however, that these examples are intended for illustration only, and it is not intended that the invention be limited thereby.

EXAMPLE 1

1,2-bis[2-(4,4-dimethyl-2-oxazolyl)]ethane (P-1911), b.p. 124°–134° at 10 mm, was prepared by reacting succinic acid (1 mole) with 2-amino-2-methyl-1-propanol (2 moles) by methods known in the art.

The acute oral $LD_{50}$ in mice was determined to be 2,000 ± 167 mg/kg. The $LD_0$ was 1,500 mg/kg and the $LD_{100}$ was 3,000 mg/kg. Animals receiving the compound were tranquilized.

The product was additionally tested by the method of Horn described above. The $LD_{50}$ by intravenous administration was greater than 320.0 mg/kg. The median effective dose for tranquilization was 32.0 mg/kg (10.0–100.0) and the safety factor was greater than 10.0.

EXAMPLE 2

The experiment of Example 1 was repeated in all essential details except that adipic acid was substituted for succinic acid on an equi-molar basis. The product, 1,4-bis-[2-(4,4-dimethyl-2-oxazolyl)] butane (P-1920) was administered orally to white mice. The $LD_0$ was 875 mg/kg, the $LD_{50}$ 1,560 ± 130 mg/kg, and the $LD_{100}$ was 2,800 mg/kg. Animals receiving the compound were tranquilized.

The product was additionally tested by the method of Horn. The $LD_{50}$ by intravenous administration was 180.0 mg/kg (56.0–560.0). The median effective dose for tranquilization was 56.0 mg/kg (18.0–180.0) and the safety factor was 3.2.

EXAMPLE 3

Benzaldehyde was reacted with 4,4-dimethyl-2-ethyl-2-oxazoline to produce 4,4-dimethyl-2-(1-methyl-2-phenylethenyl)-2-oxazoline (P-1885), b.p. 109°–110° at 0.1–0.3 mm and 137°–138° at 4.0 mm. It was administered to mice to determine the oral toxicity. The $LD_{50}$ was approximately 5,500 mg/kg. The $LD_0$ was 1,500 mg/kg and the $LD_{100}$ was approximately 10 g/kg. It was a very active tranquilizer.

The compound was further tested by the method of Horn. The $LD_{50}$ by intravenous administration was 180 (56–560) mg/kg, and the median effective dose for tranquilization was 5.6 mg/kg (1.8–18.0). The safety ratio was 32.0.

EXAMPLE 4

4,4-Dimethyl-2-p-methoxyphenyl-2-oxazoline (P-1873), b.p. 148°–154° at 10 mm, was prepared by condensing p-methoxybenzoic acid and 2-amino-2-methyl-1-propanol by the method of Purcell cited hereinbefore. The acute oral $LD_{50}$ was determined to be 2,780 mg/kg. The $LD_0$ was 1,500 mg/kg and the $LD_{100}$ was 4,500 mg/kg. Animals receiving it were tranquilized.

The product was additionally tested by the method of Horn. The $LD_{50}$ by intravenous administration was 180.0 (56.0–560.0) mg/kg. The median effective dose was 32.0 mg/kg (10.0–100.0) and the safety factor was 5.6.

EXAMPLE 5

2,4,4-Trimethyl-2-oxazoline (P-1919), a known compound, was administered orally to laboratory white mice. Animals receiving it were observed to be tranquilized. The oral $LD_0$ was 1,700 mg/kg, the $LD_{50}$ was 2,800 mg/kg and the $LD_{100}$ was greater than 5,000 mg/kg.

The compound was additionally tested by the method of Horn. The $LD_{50}$ by intravenous administration was greater than 320.0 mg/kg. The median effective dose for tranquilization was 10.0 mg/kg (3.2–32.0). The safety factor was greater than 32.0.

EXAMPLE 6

2-(2-p-Chlorophenyl-1-methylethenyl)-4-hydroxymethyl-4-methyl-2-oxazoline (P-1580) was synthesized from 2-ethyl-4-hydroxymethyl-4-methyl-2-oxazoline and p-chlorobenzaldehyde.

The acute $LD_{50}$ by oral administration to mice was determined to be 2,750 ± 355 mg/kg. The $LD_0$ was approximately 1,500 mg/kg and the $LD_{100}$ approximately 5,000 mg/kg. Animals receiving the compound were tranquilized.

The compound was additionally tested by the method of Horn. The $LD_{50}$ by intravenous administration was 180 mg/kg (56–560); the median effective dose for tranquilization was 18.0 mg/kg (5.6–56); the safety factor was 10.

EXAMPLE 7

4,4-Dimethyl-2-(p-dimethylaminophenyl)-1-methylethenyl-2-oxazoline (P-1889) was made by reacting p-dimethylaminobenzaldehyde with 4,4-dimethyl-2-ethyl-2-oxazoline.

The acute $LD_{50}$ by oral administration to mice was 2,350 ± 260 mg/kg. The $LD_0$ was 1,500 mg/kg and the $LD_{100}$ was 3,000 mg/kg. Animals receiving the compound were moderately tranquilized.

The compound was additionally tested by the method of Horn. The $LD_{50}$ by intravenous administration was 180 (56–560) mg/kg and the median effective dose for tranquilization was 10 (3.2–32.0) mg/kg. The safety factor was 18.0.

EXAMPLE 8

2-Ethyl-4,4-dimethyl-2-thiazoline (P-1921) was administered orally to laboratory mice. Animals receiving it were tranquilized. The oral $LD_0$ was 740 mg/kg, the $LD_{50}$ was 930 mg/kg and the $LD_{100}$ was 1,150 mg/kg. The compound is administered orally to animals in need of tranquilizing in a dosage of from about 18 to about 180 mg/kg.

The compound was additionally tested by the method of Horn. The $LD_{50}$ by intravenous administration was 180.0 mg/kg (56.0–560.0) and median effective dose for tranquilization was 5.6 mg/kg (1.8–18.0). The safety factor was 32.0.

EXAMPLE 9

4,4-Dimethyl-2-methoxymethyl-2-oxazoline (P-1904) was synthesized from 2-methoxyacetic acid and 2-amino-2-methyl-1-propanol according to the method of Purcell, Supra.

The acute $LD_{50}$ by oral administration to mice was approximately 4,100 mg/kg. The $LD_0$ was 3,200 mg/kg and the $LD_{100}$ was 4,800 mg/kg. Animals receiving the compound were tranquilized.

The product was further tested by the method of Horn, using water as the suspending medium. The $LD_{50}$ by intravenous administration was greater than 320 mg/kg. The median effective dose was 56 mg/kg (18.0–180.0) and the safety factor was greater than 5.7.

I claim:
1. A method of tranquilizing a warm-blooded animal comprising administering to a warm-blooded animal in need of such treatment a tranquilizing amount of the compound 2-ethyl-4,4-dimethyl-2-thiazoline or a pharmaceutically acceptable salt thereof in an oral dosage of from about 1.8 to about 18 mg/kg or by administering a pharmaceutically acceptable salt thereof intravenously.
2. The method of claim 1 wherein said compound is administered intravenously in a dosage of about 1.8 to about 18.0 mg/kg.
3. The method of claim 1 wherein the said compound is administered in the form of a pharmaceutically acceptable salt.

* * * * *